(12) United States Patent
Smith et al.

(10) Patent No.: US 10,486,957 B2
(45) Date of Patent: *Nov. 26, 2019

(54) BEVERAGE DISPENSING SYSTEM WITH DISPOSABLE LINER AND FAUCET

(71) Applicant: DS Smith Plastics Limited, London (GB)

(72) Inventors: Richard W. Smith, Zionsville, IN (US); Brent W. Todd, Westfield, IN (US); R. Randall Frisk, Indianapolis, IN (US)

(73) Assignee: DS Smith Plastics Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,807

(22) Filed: Sep. 28, 2018

(65) Prior Publication Data

US 2019/0031491 A1 Jan. 31, 2019

Related U.S. Application Data

(63) Continuation of application No. 15/000,463, filed on Jan. 19, 2016, now Pat. No. 10,112,820.

(51) Int. Cl.
*B67D 3/00* (2006.01)
*F16K 7/06* (2006.01)
*B67D 3/04* (2006.01)

(52) U.S. Cl.
CPC ......... *B67D 3/0061* (2013.01); *B67D 3/0067* (2013.01); *B67D 3/041* (2013.01); *F16K 7/063* (2013.01)

(58) Field of Classification Search
CPC .... B67D 3/0061; B67D 3/0067; B67D 3/041; F16K 7/063
USPC .......................................................... 222/214
See application file for complete search history.

(56) References Cited

U.S. PATENT DOCUMENTS

| 2,549,207 | A | * | 4/1951 | Saul | ......................... | B67D 1/04 |
| | | | | | | 177/234 |
| 2,601,319 | A | * | 6/1952 | Norris | .................... | B67D 3/041 |
| | | | | | | 222/131 |
| 4,667,924 | A | * | 5/1987 | Speidel | ................... | F16K 7/063 |
| | | | | | | 251/7 |
| 4,961,508 | A | * | 10/1990 | Weimer | ............... | B67D 1/0001 |
| | | | | | | 222/183 |
| 5,443,186 | A | * | 8/1995 | Grill | .................... | B67D 1/0418 |
| | | | | | | 222/396 |

(Continued)

*Primary Examiner* — Benjamin R Shaw
(74) *Attorney, Agent, or Firm* — McAndrews, Held & Mallory, Ltd.

(57) ABSTRACT

A faucet assembly for a beverage dispensing container and container liner assembly with a tube, the container having a fitting assembly, includes a main body having a first surface and a connection assembly for connecting to the fitting assembly; a lid having a lid having a second surface and closed and open positions, the closed position including the first surface being held against the second surface so that the lid and the main body define a distal passageway for holding the tube and having a centerline, the centerline defining three points not on a straight line, and the open position including the first surface being in a position not held against the second surface; and a valve assembly connected with the main body for selectively pinching closed a tube extending through the distal passageway.

38 Claims, 11 Drawing Sheets

(56) References Cited

U.S. PATENT DOCUMENTS

| | | | | |
|---|---|---|---|---|
| 7,721,921 | B2* | 5/2010 | Ramusch | B67D 1/1422 222/212 |
| 8,052,012 | B2* | 11/2011 | Kelly | B05B 1/30 222/399 |
| 8,678,247 | B2* | 3/2014 | Haskayne | B67D 1/1411 222/400.7 |
| 2003/0006254 | A1* | 1/2003 | Itou | B67D 1/1411 222/518 |
| 2004/0099687 | A1* | 5/2004 | Magermans | B67D 1/0412 222/105 |
| 2005/0072806 | A1* | 4/2005 | Spray | B67D 1/1405 222/214 |
| 2006/0151528 | A1* | 7/2006 | Wauters | B67D 1/0831 222/129.1 |
| 2010/0200613 | A1* | 8/2010 | Smith | B67D 3/0054 222/105 |
| 2014/0102570 | A1* | 4/2014 | Schaefer | B67D 3/041 137/801 |

* cited by examiner

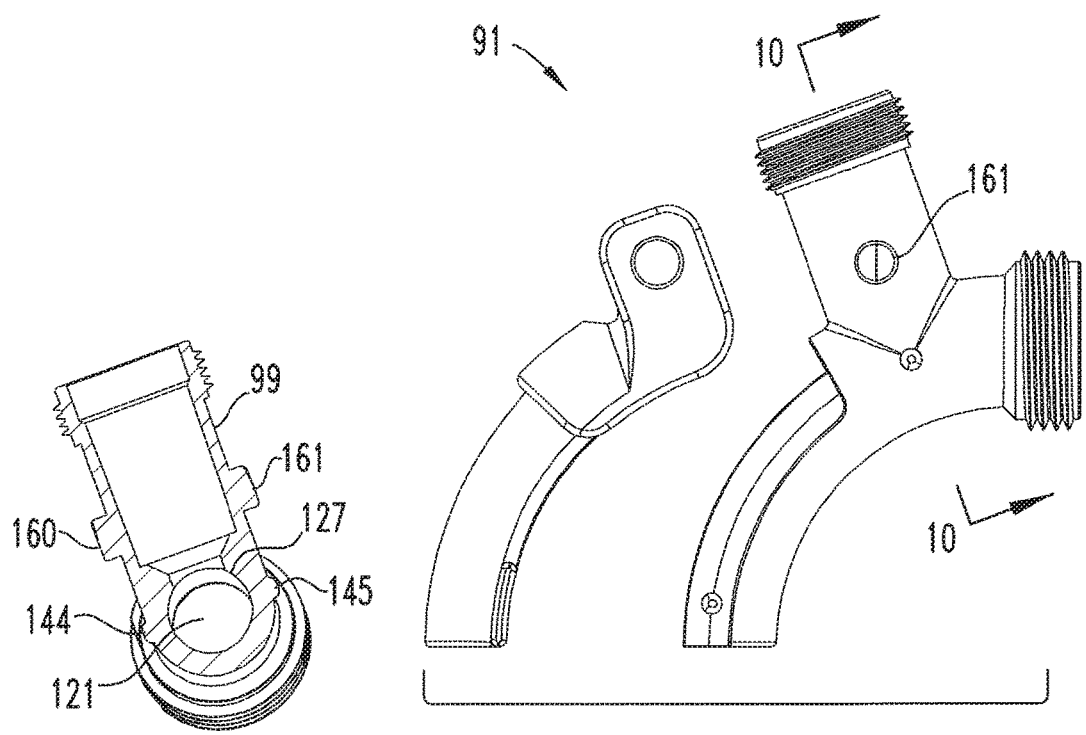

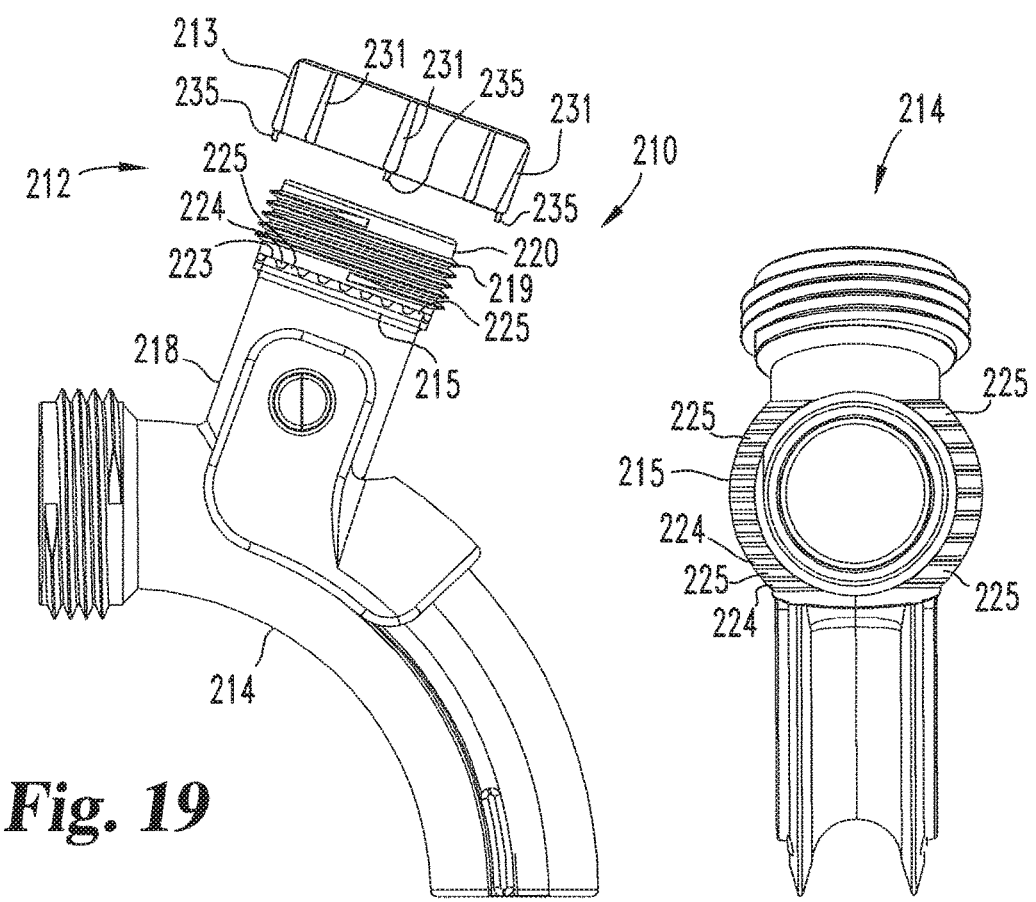
*Fig. 19*
*Fig. 20*
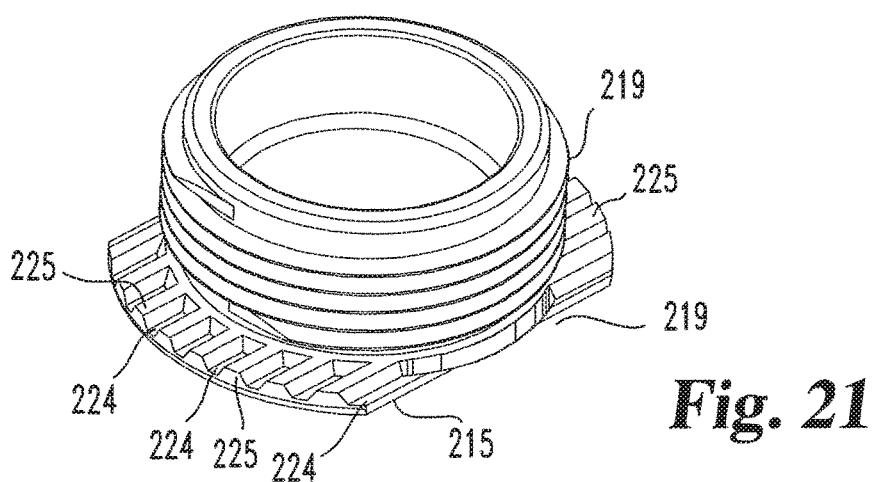
*Fig. 21*

BEVERAGE DISPENSING SYSTEM WITH DISPOSABLE LINER AND FAUCET

RELATED APPLICATIONS

This application makes reference and claims priority to U.S. Non-Provisional patent application Ser. No. 15/000,463, filed on Jan. 19, 2016 and titled "Beverage Dispensing System with Disposable Liner and Faucet." U.S. Non-Provisional patent application Ser. No. 15/000,463 is hereby incorporated by reference herein in its entirety.

FIELD OF THE INVENTION

This invention relates to beverage dispensing systems and, more specifically, to a beverage dispensing system with a container, a disposable plastic liner and a faucet assembly.

BACKGROUND OF THE INVENTION

Beverages can be dispensed in a variety of ways, such as in single serving containers like bottles and cans, or in bulk such as from a gallon jug, or even larger, from a soda fountain or large beverage container with a faucet. Examples of the latter case include large tea urns and large insulated water jugs. These are typically provided with a faucet (or tap or spigot of some type) that has a valve member that can be pulled, squeezed or pivoted to selectively open (and close) a valve. Such action allows the beverage to flow freely from the container and into a waiting cup positioned directly below the faucet.

In some applications, the beverage dispensing system includes a beverage container, a faucet and a plastic and disposable liner (a bag with an opening at the top) disposed inside the container. The liner includes a relatively thin-walled outflow tube connected to and near its bottom by a complementary fitment whereby the lumen (interior passageway) of the tube is in communication with the inside of the bag. When the liner is inserted into the container, the tube—typically made of rubber or a synthetic elastomer—is pushed through a passageway defined in the faucet. The faucet is designed, upon activation of its valve member, to drive a pin or plunger down against the tube and to pinch off the tube, thereby selectively preventing beverage from flowing through the tube.

Typically, the tube first exits the container and extends into the faucet at a zero degree angle (that is, horizontal) and then curves through an angle of about 90 degrees (or less in some embodiments), through and out the end of the faucet where it then points straight down (or nearly straight down) toward a waiting beverage cup. Bending such tubing, usually even a few degrees and without any external constraint, will create a kink, which impedes flow through the tube To reduce kinking and to maximize flow rate through the tube, the faucet passageway diameter should be as large as possible and the tube's outer diameter should be roughly the same as the inner diameter of the faucet passageway. However, frictional forces between the rubber (or similar material) tubing and the (typically plastic) passageway walls then make it difficult, if not impossible, to push the thin-walled and flexible tubing through the arcing faucet passageway. So, the tubing's outer diameter (for a given faucet inner diameter) is reduced enough to reduce frictional contact between tube and passageway walls to enable the tube to be pushed through the arcing passageway. Now, because the tubing's wall thickness has been reduced (outer diameter reduced, inner diameter unchanged), the tubing will usually kink at one or more locations inside the now larger and arcing passageway. Thus, the wall thickness must be increased to resist kinking, which means the inner wall diameter is reduced, thus reducing flow rate, and so on.

One attempt to address this kinking effect is described in U.S. Pat. No. 8,757,441 to Smith, which teaches making the faucet passageway in an oval rather than circular shape, the narrowest dimension of the oval being closer to the outer diameter of the tube. Even if this oval shape does reduce kinking, it still generates frictional resistance to pushing the tube through the passageway.

Another way to reduce the frictional resistance is to make the tube and/or faucet of different materials and/or to coat the tube and/or faucet passageway walls with materials that reduce the coefficient of friction therebetween. These configurations have been made, but they are prohibitively more costly.

What is needed is an improved beverage dispensing system with container, liner and faucet.

SUMMARY OF THE INVENTION

Generally speaking, a faucet assembly for use with beverage dispensing containers with disposable plastic liners includes a main body and a lid hingedly connected to the main body to enable easy insertion of a dispensing tube therethrough, after which the lid is pivoted to a closed position against the main body to secure the tube in a curved and unkinked position within the passageway created by the lid and main body combination.

In one embodiment, a faucet assembly for a beverage dispensing container and container liner assembly with a tube, the container having a fitting assembly, includes a main body having a first surface and a connection assembly for connecting to the fitting assembly; a lid having a second surface and closed and open positions, the closed position including the first surface being held against the second surface so that the lid and the main body define a distal passageway for holding the tube and having a centerline, the centerline defining three points not on a straight line, and the open position including the first surface being in a position not held against the second surface; and a valve assembly connected with the main body for selectively pinching closed a tube extending through the distal passageway.

It is an object of the present invention to provide an improved faucet assembly for use with beverage dispensing containers with disposable plastic liners.

Other objects and advantages will become apparent from the following description of the preferred embodiment.

BRIEF DESCRIPTION OF THE DRAWINGS

FIG. 9 is a left side view of the faucet assembly 91 of FIG. 8.

FIG. 10 is a cross-sectional view of the faucet assembly 91 of FIG. 9 taken along the lines 10-10 and viewed in the direction of the arrows.

FIG. 19 is a side view of a main body 210 and cap 211 for the faucet assembly 91 of the beverage dispensing system 90 of FIG. 3 in accordance with another embodiment of the present invention.

FIG. 20 is a top view of the main body 210 of FIG. 19.

FIG. 21 is a perspective view of the main body 210 of FIG. 19.

DESCRIPTION OF THE PREFERRED EMBODIMENT

Figure 1:
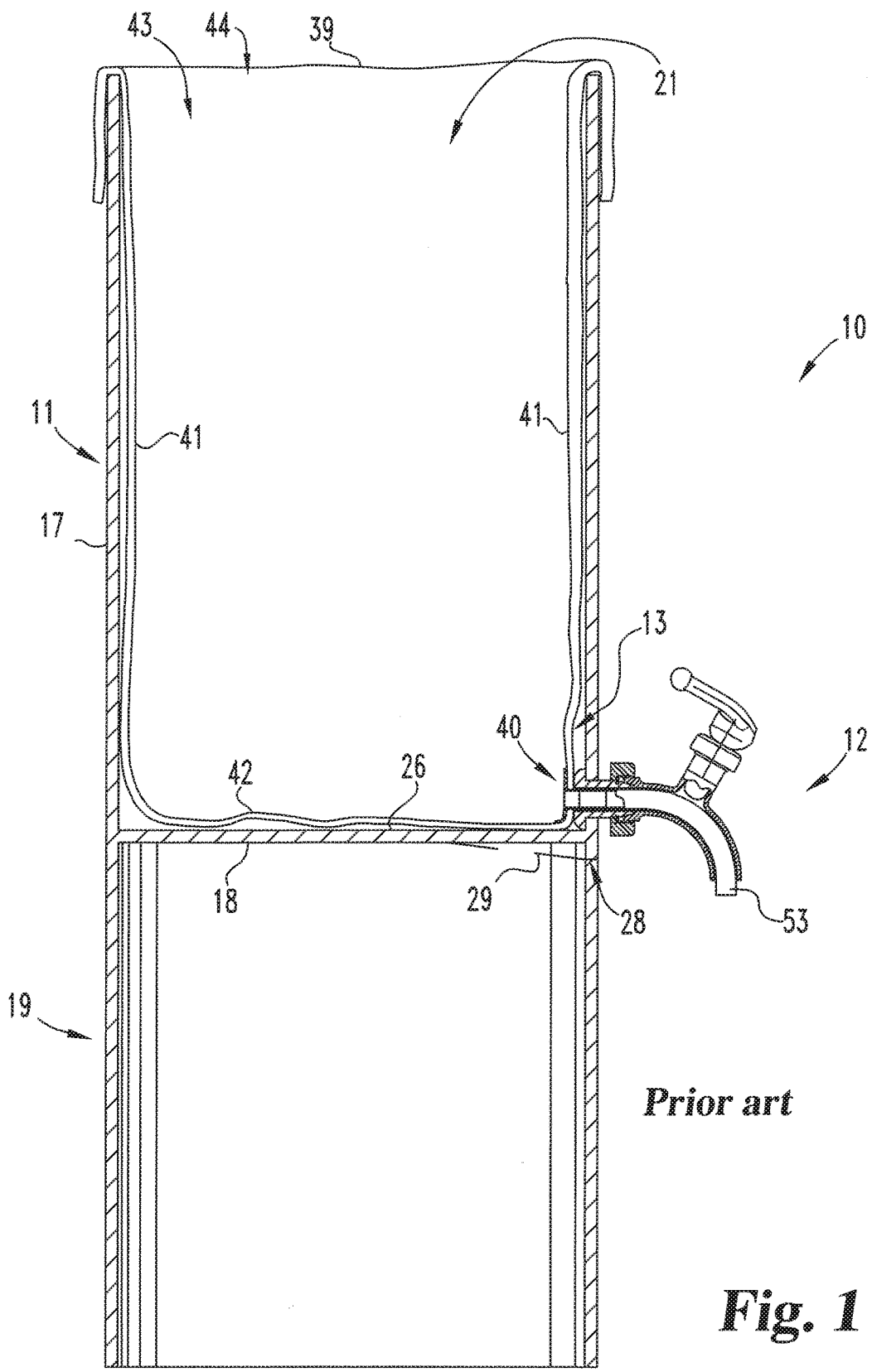
FIG. 1 is a right side, cross-sectional view of a beverage dispensing system 10 showing features representative of dispensing systems known in the art.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Figure 2:
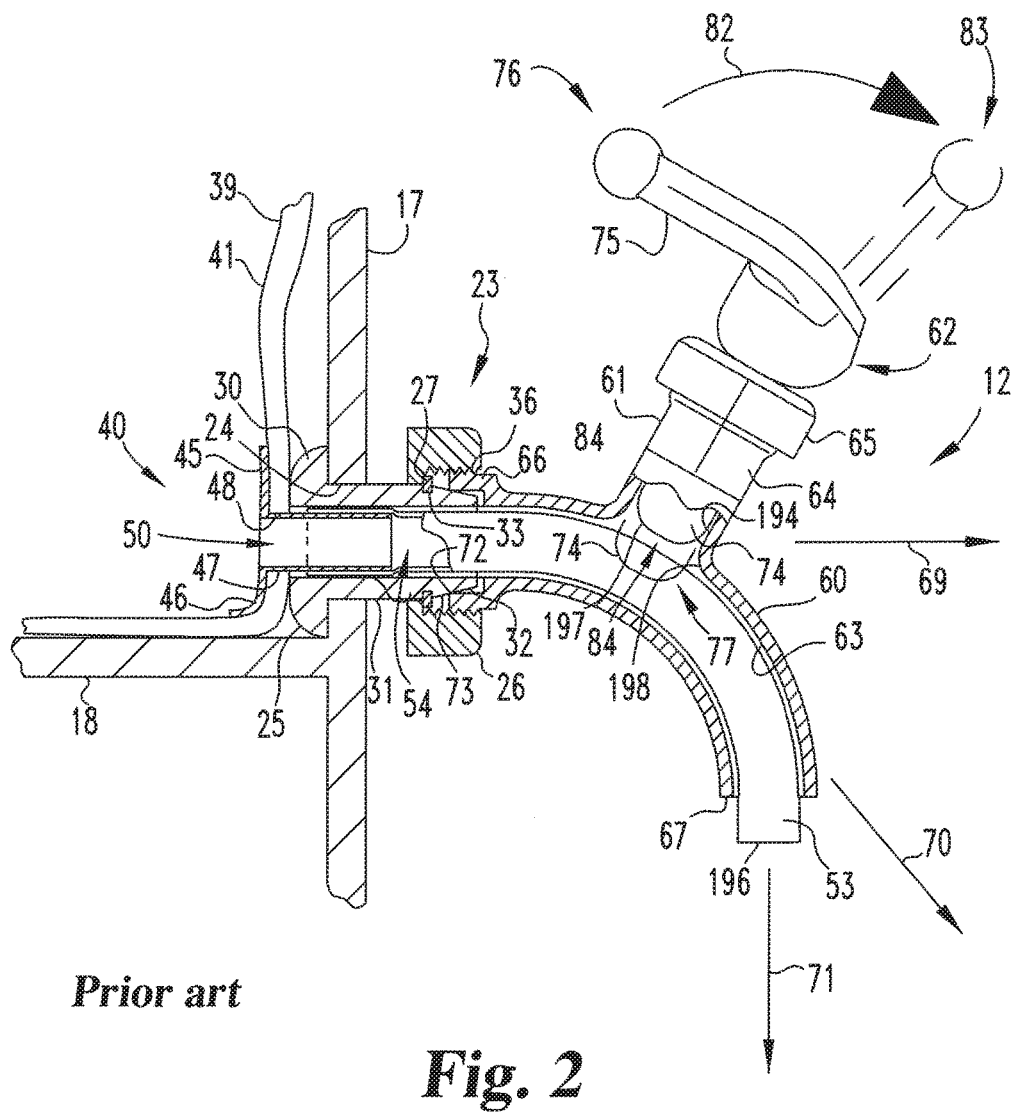
FIG. 2 is a cross-sectional, enlarged view of the faucet assembly 12 and a portion of the container 17 of the beverage dispensing system 10 of FIG. 1.
Figure 3:
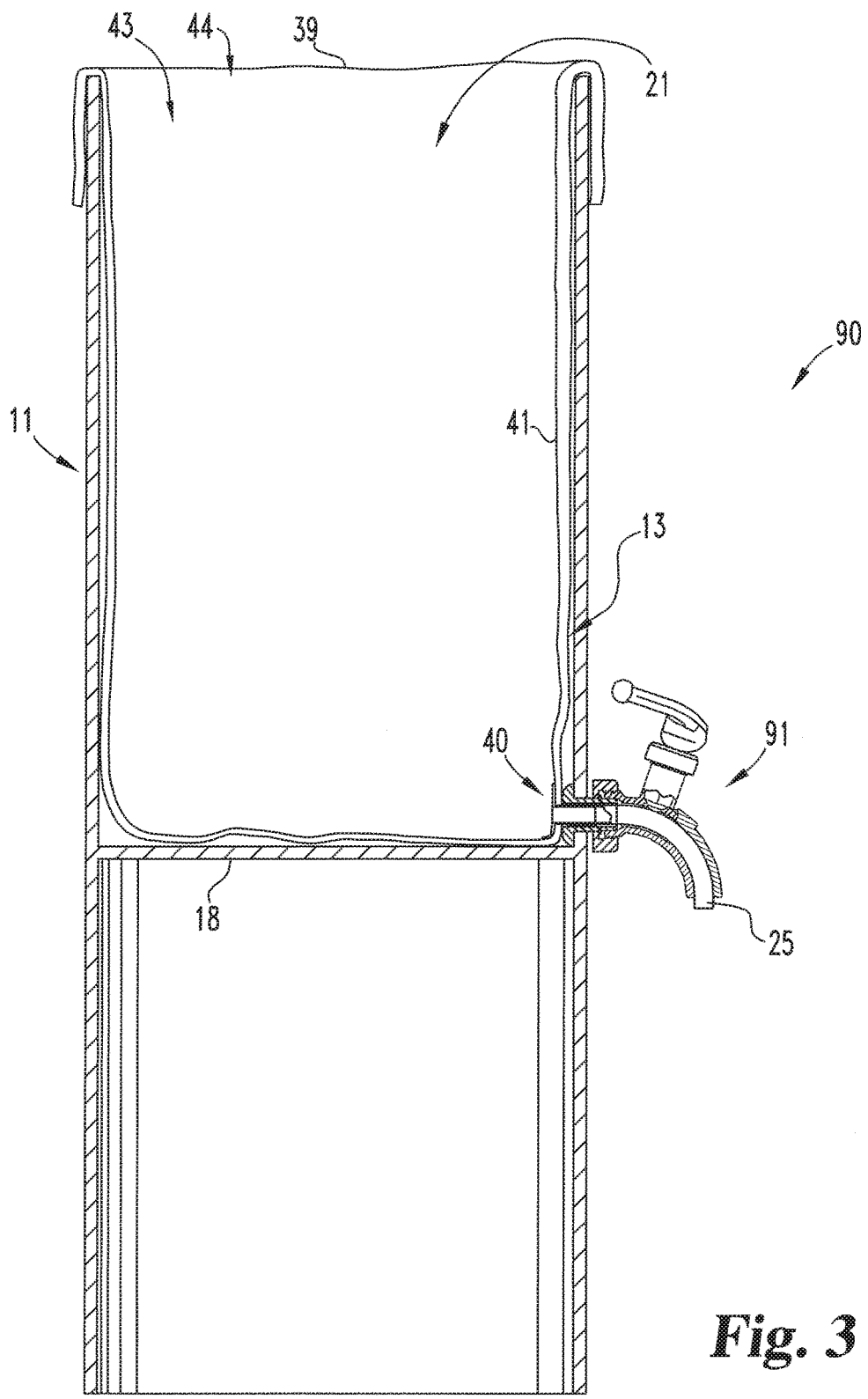
FIG. 3 is a right side, cross-sectional view of a beverage dispensing system 90 with disposable container liner in accordance with the present invention.

Referring to FIGS. 1 and 2, there is shown a beverage dispensing system 10 showing features representative of dispensing systems known in the art. Beverage dispensing system 10 includes a container 11, a faucet assembly 12 and a container liner assembly 13. Container 11 has side walls 17, a bottom 18 connected to side walls 17 a distance up from the bottom of side walls 17, which thus forms a container base 19 and, defined by side walls 17 and bottom 18, a cavity 21 for receipt therein of a beverage or, first a container liner, and then a beverage poured therein. As the shape of container 11 may, in a horizontal cross-section, be round, oval, rectilinear or any other desired shape, side walls 17 or a portion thereof may be referred to interchangeably in the singular or plural.

Container 11 includes a faucet fitting assembly 23 mounted thereto at a hole 24 defined in wall 17 to enable a dispensing tube (53) to be extended therethrough. The hole 24 and fitting assembly 23 are disposed as close to the bottom 18 of container 11 as possible. Alternative embodiments are contemplated wherein the hole 24 is lowered (then shown at 28) and a portion of the bottom 18 that leads to the lowered hole 28 dips down (at 29) so that the lowered hole 28 is at or below the rest of bottom 18. In this configuration, the last amounts of liquid in a bag positioned inside cavity 21 can more easily drain from the bag.

Fitting assembly 23 includes a grommet 25, a locking ring 26 and a stop ring 27. Grommet 25 has an annular ring section 30 that is bonded or otherwise connected to the inside of wall 17 at and around hole 24. From ring section 30, grommet 25 extends outwardly with a cylindrical cross-section to form a mounting nipple 31, which is slightly tapered (about 15°) at its outermost end 32. Inwardly of outermost end, nipple 31 defines an annular groove 33 into which is seated the stop ring 27. Stop ring 27 is a C-ring or similar structure that extends from groove 33 a short distance radially outwardly of nipple 31, as shown.

Locking ring 26 defines a central hole that has a first diameter slightly greater than the outer diameter of stop ring 27 and is there internally threaded (at 36) and has a second diameter that is just slightly greater than the outer diameter of nipple 31 and less than the outer diameter of stop ring 27. In assembly, locking ring 26 is coaxially received over nipple 31, and stop ring 27 is then applied to constrain locking ring 26 to move between the outside of container 11 and stop ring 27, as shown.

Container liner assembly 13 includes a flexible and disposable bag 39 and a dispensing conduit or tube apparatus 40. As is known in this art, bag 39 may comprise many configurations, such as a tubular sleeve that is sealed together at its bottom, or front and back panels that are sealed together at their sides to form a sleeve and then also at their bottoms. The resulting configuration, in either case, is a generally tubular pouch with sides 41 (referred to herein interchangeably in the singular or plural), a bottom 42, a pouch interior 43, and an opening 44 defined at its top.

The dispensing conduit or tube apparatus 40 is shown very simplistically as having a fitting 45 (also known as a spout or gland) and a tube 53. Fitting 45 has an interior, radially extending flange 46 and a cylindrical portion 47 extending therefrom outwardly through an opening 48 defined in the bag side 41. The flange 46 and cylindrical portion 47 together define a central passageway 50 extending therethrough. (For purposes of discussion, dimensions are exaggerated somewhat to facilitate description. For example, the bag sides 41 are in one embodiment 4 mils thick, while flange 46 is about 0.05 inches thick. The relative dimensions of fitting 45 and bag sides 41 are selected to optimize various manufacturing and use factors such as cost, weight, strength, heat tolerance and ease of manipulation). Rear flange 46 is sealingly connected to the inner (or outer) surface of bag side 41 by appropriate means such as by application of heat and pressure or by ultrasonic welding so that central cylindrical portion 47 extends through (or from) and outwardly from opening 48, and so that central passageway 50 is aligned with opening 48, is in communication with the pouch interior 43, and extends generally perpendicularly from the bag side 41 at its point of connection thereto, as shown. Fitting 45 is made of any suitable plastic, such as polyethylene.

Dispensing conduit 40 further includes tube 53, the proximal end of which is here shown connected by a pressure fit onto cylindrical portion 47. Tube 53 extends outwardly from its connection to cylindrical portion 47, and its central lumen 54 is thus in communication with the central passageway 50 of fitting 45, and thus with pouch interior 43. Other configurations of dispensing conduit 40 are contemplated so long as they connect a tube (53) to a bag (39) to permit the flow of a liquid in the bag through the bag's opening (48) and out through the tube lumen (54). One such example of another appropriate dispensing conduit, as well as of a bag received in a container, with a tube extending for selective flow control through a faucet, (or other flow control or valve mechanism) is shown in U.S. Pat. No. 6,883,683, which is incorporated herein by reference in its entirety.

Tube 53 is a flexible tube of any suitable rubber or synthetic elastomer, as is generally known in the art. Tube 52 may be made of or coated with a material that exhibits a lower coefficient of friction (than without such material) with the inside surface of the faucet of faucet assembly 12, but such costlier configuration is not necessary with the present invention.

Faucet assembly 12 is connected to container 11 at its hole 24 to enable the dispensing tube 53 of a bag positioned in the container to extend through faucet assembly 12 and to enable faucet assembly 12 to control the flow of liquid therethrough. Faucet assembly 12 generally includes a main body 60, a valve housing 61 and a valve assembly 62. Valve housing 61 includes a valve body 64 (here integrally formed with main body 60) and a cap 65 that is threadedly received onto the valve body. Main body 60 defines a central passageway 63 that extends from a threaded proximal end 66 of main body 60 to the distalmost end 67 of main body 60, the passageway 63 curving from a zero degree (horizontal) angle 69 coming out of container 11 and through, usually, at least 50 degrees (at 70), and typically through 90 degrees (71), as shown. Faucet assembly 12 is connected to container 11 by positioning it so that the tapered, outermost end 32 of nipple 31 extends into the threaded, proximal end 66 of faucet assembly 12. The exterior threading of end 66 provides the means for connecting to the fitting assembly 23 of container 11. Locking ring 26 is then screwed onto threaded end 66, drawing the circular rim 72 of threaded end 66 tightly against the tapered outer surface 73 of end 32. Any other means that tightly secures the faucet assembly 12 (or faucet assembly 91, below) to the container 11 at its hole 24 is contemplated.

Faucets of other configurations also exist, such as one that, instead of smoothly curving through an angle (as shown by the faucet assembly of FIG. 2), it extends horizontally out from the container 11, then somewhat abruptly bends downwardly one or more times until its end (as at 67) points in the desired direction. Alternative embodiments are contemplated wherein the present invention faucet assembly 91, as described below, while having the best performance with a curving faucet shape (like main body 60) could be configured with a bending shape, as well.

Central passageway 63 is sized to enable tube 53 to be pushed through it, that is, from inside container 11, through passageway 63 and to or slightly out the distalmost end 67 of main body 60. Due to usual frictional effects, unless special low friction materials are used for tube 53 (and or main body 60), the outer diameter of tube 53 will need to be some significant measure less than that of passageway 63 to enable tube 53 to be pushed through the arcing passageway 63. The longer the arc of passageway 63 (and/or the small the radius of curvature of passageway 63), the greater that the tube 53 extending through passageway 63 must curve or bend and the greater is the contact between tube 53 and the interior surface of the passageway 63. It is not the usual nature of such rubber or synthetic material tubing to smoothly curve in a constant (or non-constant) radius. Thus the greater the arc of passageway 63, and/or the smaller the radius of curvature of passageway 62, the more resistance will be realized, and the more the tube will tend to kink.

Valve assembly 62 includes a plunger 74 pivotally connected to a handle 75 by a post (not shown) that extends through a hole (not shown) in cap 65 to selectively close off the passageway 63, or rather, to pinch closed a tube extending through passageway 63. When handle 75 is in its home, closed position (as at 76), its plunger 74 is in a down position 77 against the bias of a spring (not shown, but located in the valve housing 61). In the down position 77, plunger 74 extends into passageway 63 and against tubing 53 extending therethrough, whereby the tubing is there pinched sufficiently to close off its lumen 54 and prevent fluid flow therethrough. Pivoting the handle 75 forwardly (at 82) to its open position 83 pulls plunger 74 to an up position 84, up and out of passageway 63 and sufficiently up from tube 53 to unpinch tube 53 and permit liquid to flow therethrough from pouch interior 43. Rotating handle 75 back to the home, closed position 76 then closes off the liquid flow.

Referring to FIGS. 3-13, there is shown a beverage dispensing system 90 with disposable plastic liner and faucet assembly in accordance with the present invention. Beverage dispensing system 90 is the same as beverage dispensing system 10 except with an improved faucet assembly 91, and like reference numbers will be used for components that are the same in both system 10 and 90.

Figure 4:
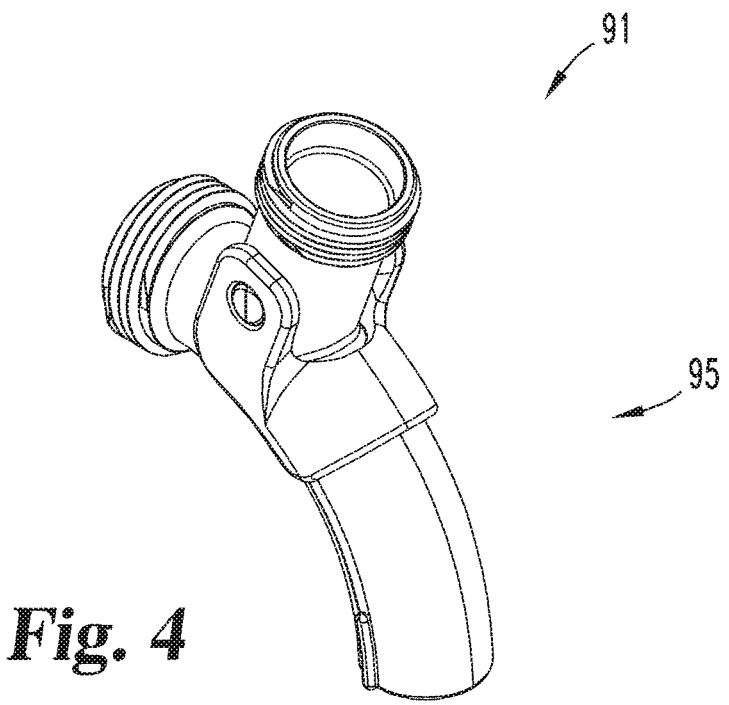
FIG. 4 is a right side perspective view of the faucet assembly 91 of the beverage dispensing system 90 of FIG. 3 and shown in the closed position 95.
Figure 5:
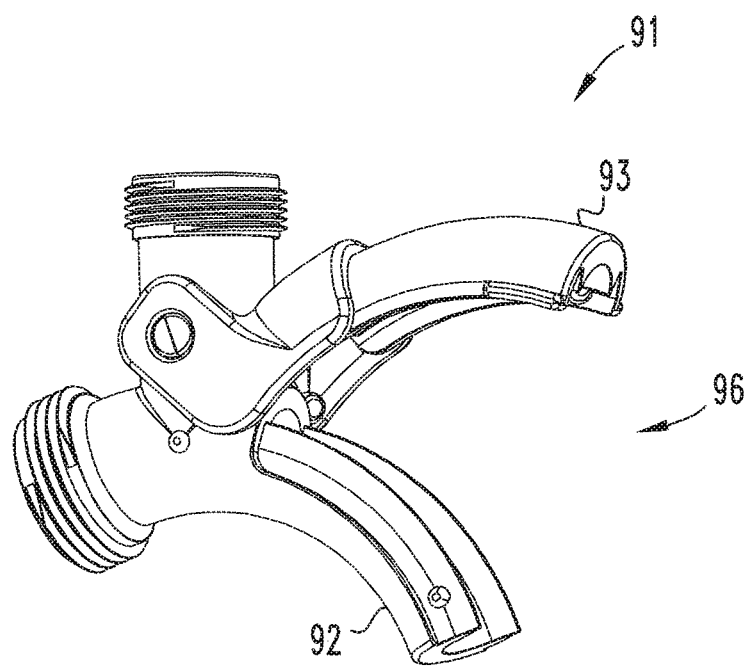
FIG. 5 is a right side perspective view of the faucet assembly 91 FIG. 4 and shown in the open position 96.
Figure 6:
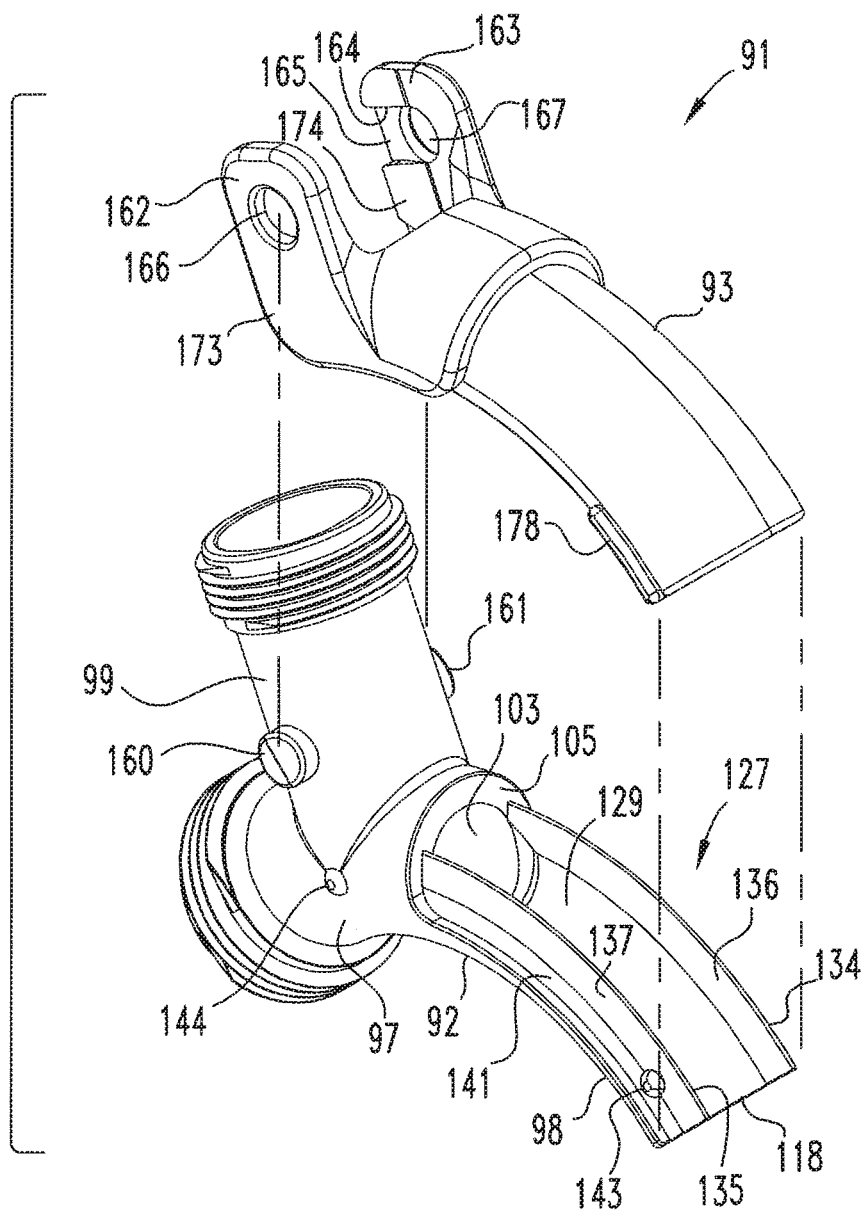
FIG. 6 is an exploded, right side perspective view of the faucet assembly 91 FIG. 4.

Referring to FIGS. 4-6, faucet assembly 91 includes a main body 92 and a lid 93 hingedly (or pivotally) connected to main body 92 to pivot or swing between a closed position 95 (FIG. 4) and an open position 96 (FIG. 5). Main body 92 has a proximal body portion 97, a distal body portion 98 and a valve housing 99, all of which, in the present embodiment, are formed together as a single, integral unit as by injection molding. Alternative embodiments are contemplated wherein any of the proximal body portion 97, distal body portion 98 and valve housing 99 can be formed separately and attached to the others in the configuration described herein.

Figures 7, 8:
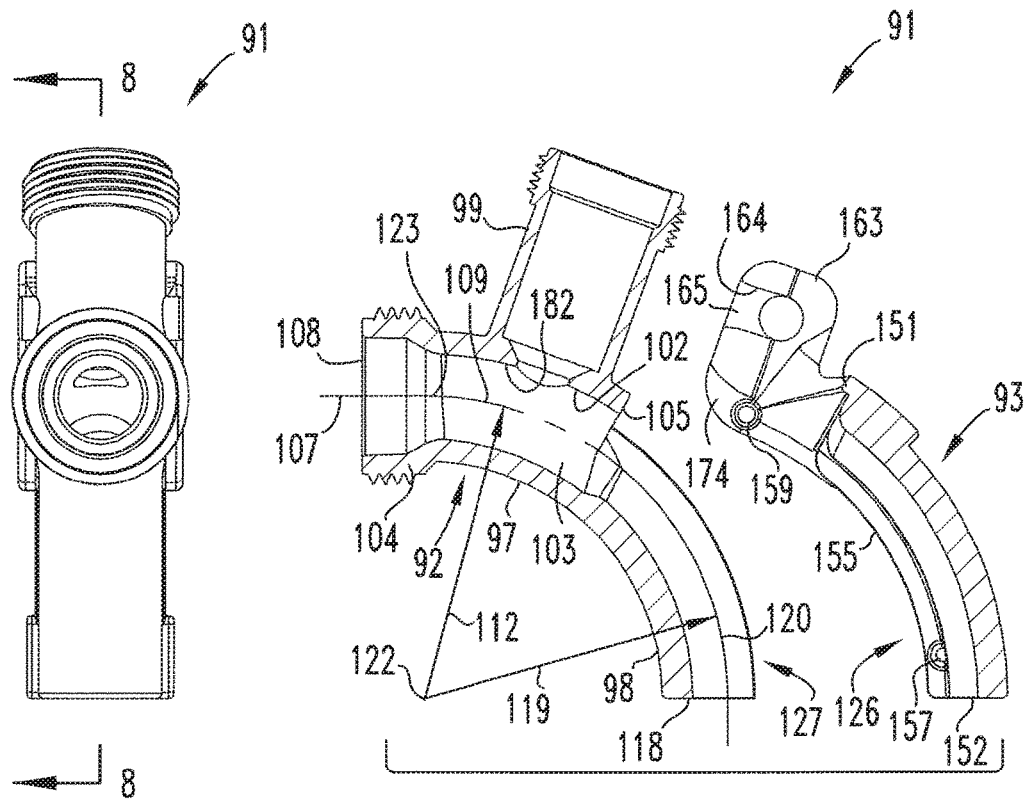
FIG. 7 is an end view of the faucet assembly 91 of FIG. 4.
FIG. 8 is a right side, cross-sectional and exploded view of the faucet assembly 91 of FIG. 7 taken along the lines 8-8 and viewed in the direction of the arrows.

Referring to FIGS. 6 and 8, proximal body portion 97 defines a central passageway 103 that extends from a threaded proximal end 104 to a central, transition section 105. The centerline 107 of passageway 103 is substantially horizontal (as shown in FIG. 8) at the innermost end 108 of proximal body portion 97 and extends through an arc (at 109) to the transition section 105 with a radius of curvature 112 of between about 1.75 inches. Alternative embodiments are contemplated wherein the faucet assembly 91 may have a larger or smaller radius of curvature. Generally speaking, the present invention comprising a main body and a lid (or similar second piece) that hingedly or otherwise closes against the main body to enclose the tube therein, will work with faucet assemblies of different radii of curvature, of different arc lengths and of different arc and/or bending configurations. All such variations are contemplated by the present invention. For example, alternative embodiments are contemplated wherein the faucet body defines a combined passageway (121, as described herein) that has one or more bends and/or one or more straight portions and/or one or more curved portions, so long as the combined passageway, at the most critical areas where tube kinking might occur, has a shape and size that is radially not larger than about 0.010 inches greater than the tube diameter at that location, and preferably not larger than about 0.005 inches greater than the tube diameter at that location, and most preferably about the same as the tube diameter at that location.

Passageway 103 and other passageways referred to herein of faucet assembly 91 are generally round in cross-section along their lengths, and the term "centerline" refers to the axis-type line that extends through the generally geographical center of the passageway. It is to be understood that a particular passageway may not at all places be perfectly round in cross-section, and the centerline is the best approximation of such axis-type line as if the passageway were perfectly round in cross-section at all locations.

Figure 11:
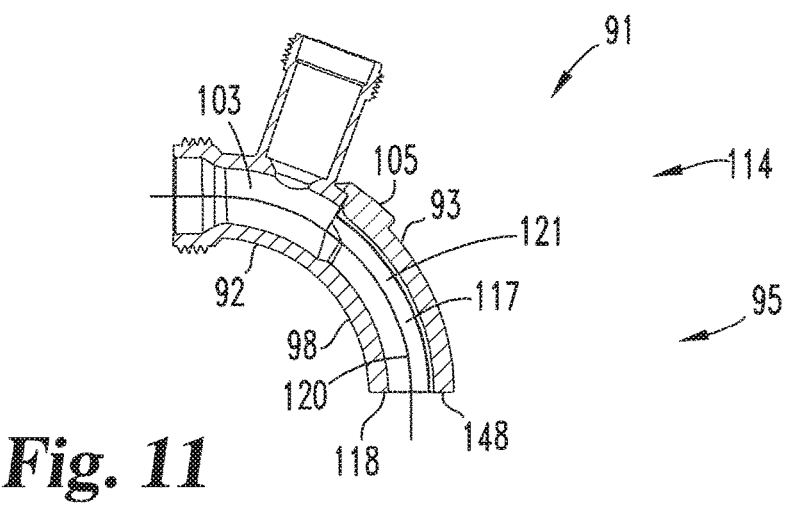
FIG. 11 is a right side, cross-sectional and assembled view of the faucet assembly 91 of FIG. 8.
Figure 12:
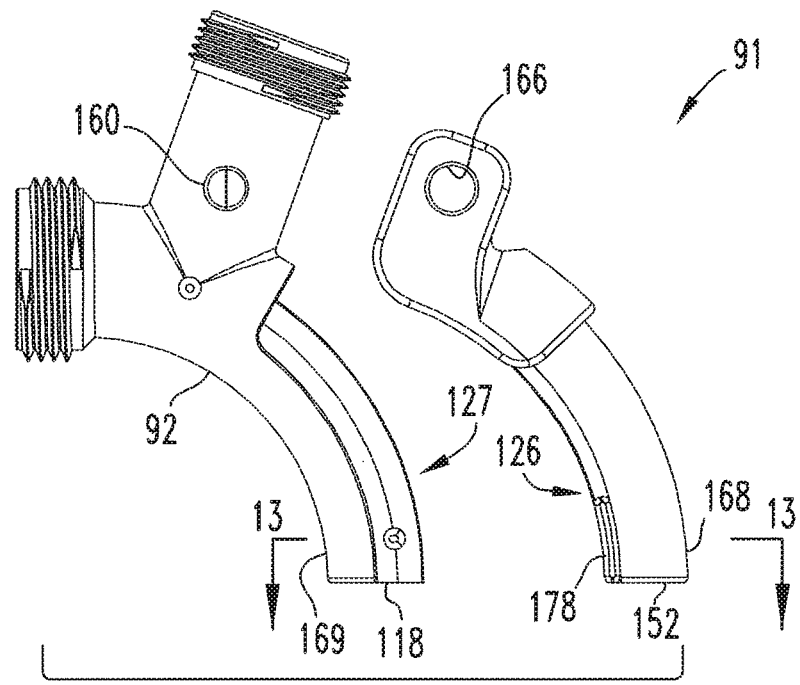
FIG. 12 is right side view of the faucet assembly 91 of FIG. 9.
Figure 13:
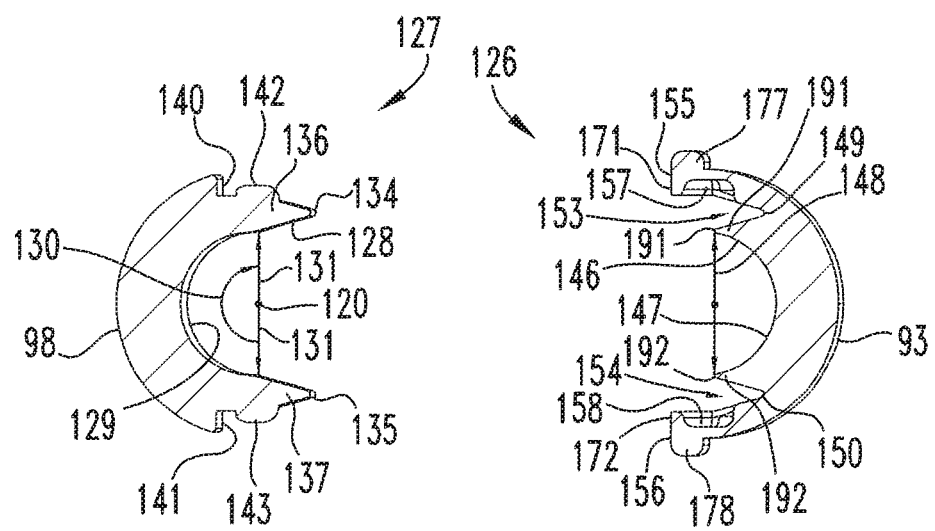
FIG. 13 is a cross-sectional view of the faucet assembly 91 of FIG. 12 taken along the lines 13-13 and viewed in the direction of the arrows.

Referring to FIGS. 8, 11 and 13, when faucet assembly 91 is in the assembled condition 114 (FIGS. 4 and 11), and lid 93 is in its closed condition 96, surfaces of lid 93 (155 and 156) and of distal body portion 98 (140 and 141) together define a distal passageway 117 with a centerline 120, the distal passageway 117 being in fluid communication with central passageway 103 and extending from transition section 105 to the distalmost end 118 of faucet assembly 91, and the central and distal passageways 103 and 117 together thus defining a combined, curved passageway 121 with a constant radius of curvature (112/119) having a center at 122. Distal passageway 117 is curved with a radius of curvature 119 that is intended to be the same as that of radius of curvature 112, and centerline 120 thus defines at least three points that are not in a straight line.

Referring to FIGS. 6, 8 and 11-13, distal body portion 98 thus forms the lower (roughly) half of distal passageway 117, and lid 93 forms the upper (roughly) half of distal passageway 117. The lower portion 126 of lid 93 and the upper portion 127 of distal body portion 98 are configured for mutual engagement to form distal passageway 117 in the desired cross-sectional configuration, as described herein. In the present embodiment, this configuration of upper portion 127 includes walls 128 (referred to in the plural, but essentially one continuous surface) that extend from transition section 105 to distalmost end 118 and define a trough 129 having a constant radius. That is, referring to FIG. 13, the radius 131 of upper portion trough 129, through its arc 130 of roughly 180°, is preferably constant and mutually identical in each plane passing perpendicularly to and through each point along centerline 120. And, each radius 131 at each point along trough 129 has its center on centerline 120. At the opposing ends of arc 130, walls 128 divergingly extend upwardly (to the right in FIG. 13) to ridge lines 134 and 135, then divergingly back down (to the left in FIG. 13) to together form opposing arcuate and tapering ridges 136 and 137. Walls 128 then extend outwardly, in opposite directions, to form arcuate ledges 140 and 141. Proximal to, but upwardly from distalmost end 118, and between ridgelines 134/135 and ledges 140/141, respectively, walls 138 extend outwardly to form small locking nubs 142 and 143. Referring to FIGS. 6 and 10, valve housing 99 includes, on its opposing sides thereof. Similarly (referring to FIGS. 6 and 10) small locking nubs 144 and 145 extend diametrically outwardly from each, on opposite sides of valve housing 99 and below hinge posts 160 and 161 (which are described below).

The lower portion 126 of lid 93 includes walls 146 that are shaped to form a trough 147 that, like trough 129, has a constant radius 148 that is the same at each point along its curved length from the inner end 151 (FIG. 8) to the distalmost end 152 of lid 93. The center for each radius for each point of lower portion trough 147 lies along centerline 120 (as measured when lid 93 is in its closed position 95) and is the same as the constant radii 131 of trough 129. When in the closed position 95, the identical radii 131 and 148 thus mean that troughs 129 and 147 meet together to form the distal passageway 117 with a round cross-sectional shape all along its length (i.e. along centerline 120).

From the opposing ends of trough 147, the walls 146 of lower portion 126 then transition, diverging out and to the right to nadirs 149 and 150 (as shown in FIG. 13), then diverging out and to the left (in as shown in FIG. 13) to form arcuate, ridge channels 153 and 154 that are sized and configured to snugly receive mating ridges 134 and 135 therein, respectively. From ridge channels 153 and 154, lid walls 146 extend slightly farther (to the left, as shown in FIG. 13) to form arcuate, lower lid edges 155 and 156 that are sized and configured to mate with arcuate ledges 140 and 141 of upper portion 127, respectively. Between ridge troughs 153 and 154 and lid edges 155 and 156, and near the distalmost end 151, walls 146 define nub pockets 157 and 158 that are sized and configured to snappingly receive therein locking nubs 142 and 143, respectively.

Referring to FIGS. 6 and 8, on its opposing sides, valve housing 99 includes hinge posts 160 and 161 extending diametrically outwardly from each other, and lid 93 defines at its upper, inner end a pair of ears 162 and 163 that extend rearwardly (to the left as shown in FIGS. 6 and 8) and upwardly. Ears 162 and 163 define inwardly facing, mirror image slots (only the one slot for ear 163 is visible at 164 in FIG. 6, but both slots are hereinafter referred to as slots 164) and inwardly facing, mirror image post pockets, or here, through holes 166 and 167. Posts 160 and 161 extend outwardly from each other a distance greater than the distance between the central surfaces 165 of the slots 164 of ears 162 and 163.

At the bottom of each ear 162 and 163 are defined opposing nub pockets (only the nub pocket 159 of ear 163 is visible, FIG. 8, but both nub pockets are hereinafter referred to as nub pockets 159), which are sized and configured, (like nub pockets 157 and 158 and their locking nubs 142 and 143), to lockingly engage with mating locking nubs 144 and 145.

The posts 160/161, ears 162/163, slots and through holes 166/167 are sized and configured to enable lid 93 to be hingedly connected to valve housing 99 by slightly bending the ears 162 and 163 apart enough to slide lid 93 onto main body 92 whereby posts 160 and 161 pass into the opposing slots 164 of ears 162 and 163 until they snap into their respective through holes 166 and 167, respectively. Posts 160/161 are shown extending from valve housing 99, and thus lid 93 is hingedly connected to the valve housing. Alternative embodiments are contemplated wherein posts 160/161 extend from a lower position, technically not on the valve housing 99, and thus lid 93 would be connected to the main body 92. All such hinged configurations are contemplated by the present invention when stated that lid 93 is pivotally connected to main body 92. Thus assembled, lid 93 can pivot about posts 160 and 161 between the open position 96 (FIGS. 5, 14 and 16) and the closed position 95 (FIGS. 4 and 14), the closed position 95 including lid 93 being releasably locked to main body 92. To complete movement of lid 92 to being locked in the closed position 95 (that is, to a snapped closed position), additional force is applied to push lid 93 down against main body 92 so that the outwardly greater-dimensioned locking nubs 142 and 143 (and the upper nubs 144 and 145) will slightly outwardly deform the opposing sides 171 and 172 of lid 93 (and the lower ends 173 and 174 of ears 162 and 163), and pass into their mating nub pockets 157 and 158 (and into nub pockets 159 of each ear bottom 173 and 174), respectively. Those opposing sides 171 and 172 (and the ear bottoms 173 and 174) (as shown in FIGS. 6 and 13) will then resiliently return to their pre-deformed positions, and nubs 142 and 143 (and 144 and 145) will be lockingly seated in their mating nub pockets 157 and 158 (and 159 of each ear bottom 173 and 174), respectively.

Figure 16:
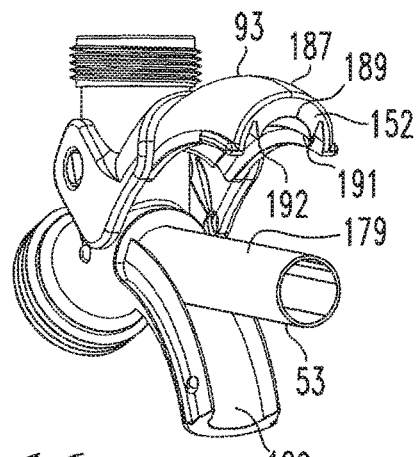
FIG. 16 is a perspective end view of the faucet assembly 91 of FIG. 14.

Lid 93 can be opened (i.e. unlocked, or unsnapped, from the closed position 95 and then pivoted to the fully open position 96) by pulling the outer ends 168 and 169 apart (using convenience tabs 177 and 178 extending outwardly from opposing sides 171 and 172 of the lid outer end 168). The nubs and nub pockets comprise locking means for releasably locking lid 93 in the closed (and locking) position 95. When unsnapped from such closed and locked position, the lid is in an open position 95, with the lid being in a fully open position, as shown in FIGS. 5 and 16. The open position is characterized in that at least a portion of lid 93 is away from distal body portion such that the distal passageway 117 defined in the closed position, with its substantially constant circular cross-sectional diameter to match that of the tube 53, no longer exists in that shape (with a substantially constant circular cross-sectional diameter) and no longer exists to hold the tube's outer end 179 (that portion of tube 53 extending outwardly of transition section 105) in the desired non-straight position (here in a substantially constant radiused, 90° arc). In another characterization, in the closed position, lid 93 is held in the proper position to hold tube 53 in the desired "use" position—here meaning that tube 53 is curved through a substantially constant radiused curve through a 90° arc and without any kinking thereof, at least in distal passageway 117, to dispense liquid to a waiting cup below. Any movement of lid 93 from the closed position—that is, by unsnapping its outer end 168 from main body outer end 169—puts lid 93 in an open position. Alternative embodiments are contemplated wherein lid 93 is held in the closed position without its outer end 168 physically contacting main body 92. That is, a third element—a locking member—would engage both main body 92 and lid 93 to hold lid 93 in the desired closed position where it and main body 92 define the distal passageway 117 to hold tube 53 therein.

Throughout its length, from its transition (the approximate point at which passageway 103 transitions from straight to curved, at about 123) to its exit at distalmost end 118, the combined curved passageway 121 (the combination of central passageway 103 and distal passageway 117) is desired to have a substantially round cross-section 127 (see FIG. 10) with a constant inner diameter. That constant diameter is preferred to be approximately the same as the outer diameter of the liquid-delivering tube 53 intended to extend therethrough, this in order to maximize the wall contact between tube 53 and combined passageway 121. The wall thickness and diameter of tube 53 and the inner diameter of the combined passageway 121 have been shown larger or smaller than actual sized to facilitate description. In one embodiment, the outer diameter of the tube 53 is 0.395 inches; the inner diameter of the combined passageway 121 is 0.400 inches; and the radius of curvature of combined passageway 121 is 1.750 inches.

Where the outer diameter of the tube 53 is D(t) and the inner diameter of combined passageway 121 is D(cp), it is desired that D(cp) be substantially constant and represented by: $D(t) \leq D(cp) \leq D(t)+0.010$ inches. More preferred is that: $D(t) \leq D(cp) \leq D(t)+0.005$ inches. Most preferred is that $D(t) \leq D(cp) \leq D(t)+0.002$ and that tube 53 have an outer diameter of about 0.390 inches. Manufacturing tolerances may produce slightly larger or smaller combined passageway and tube dimensions, thus the dimensions recited and preferred herein are understood to have a tolerance of +/−0.005 inches. Generally, however, the preferred dimensions produce a combined passageway with a substantially constant diameter that is the same or just slightly larger than the outer diameter of the tube it is designed to hold.

Alternative embodiments are contemplated wherein the diameter of combined passageway 121 is not constant along its length. That is, the invention contemplates that one or more sections of combined passageway 121 may be not round or may have a larger diameter than the rest of the combined passageway, and there will nevertheless be no deleterious kinking or other effects to the tube or liquid flow therethrough. Thus in one embodiment, combined passageway 121 has a substantially round and constant diameter cross-section throughout its length (from about transition 123 to distalmost end 152). In another embodiment, combined passageway 121 has a substantially round cross-section throughout its length, has a constant diameter in distal passageway 117, and a slightly larger diameter in central passageway 103.

Figure 14:
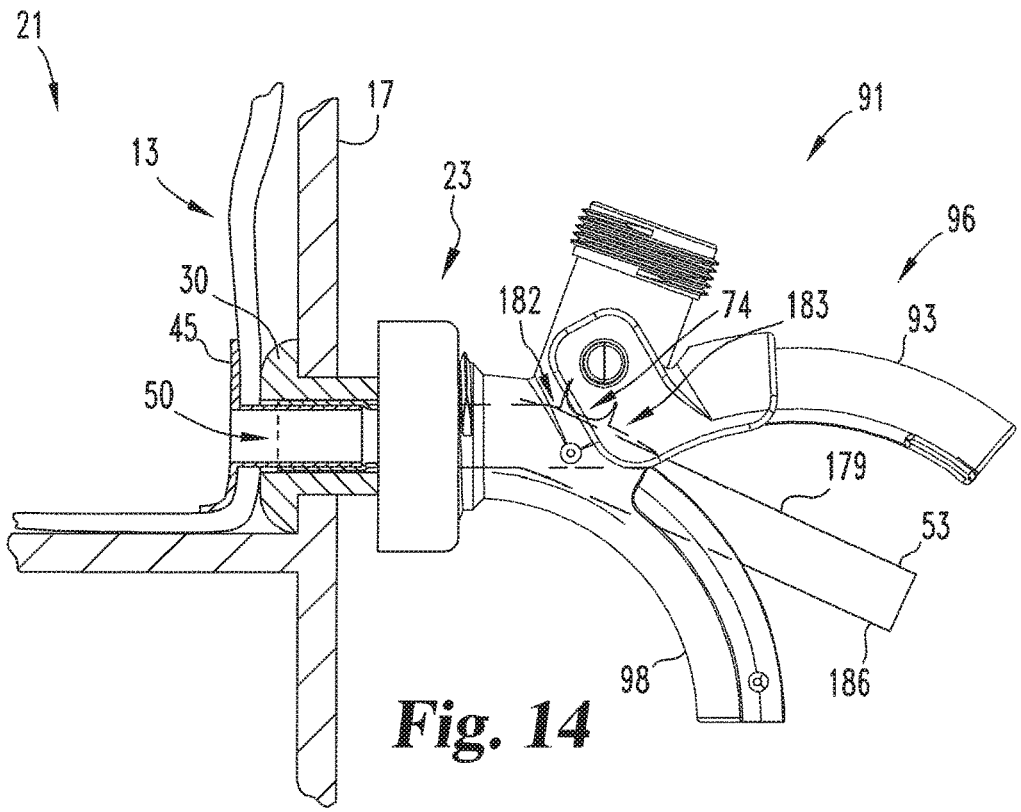
FIG. 14 is a side, partially cross-sectional and enlarged view of the faucet assembly 91 and a portion of the container 17 of the beverage dispensing system 90 of FIG. 3, and with the faucet assembly 91 in the open position 96.
Figure 15:
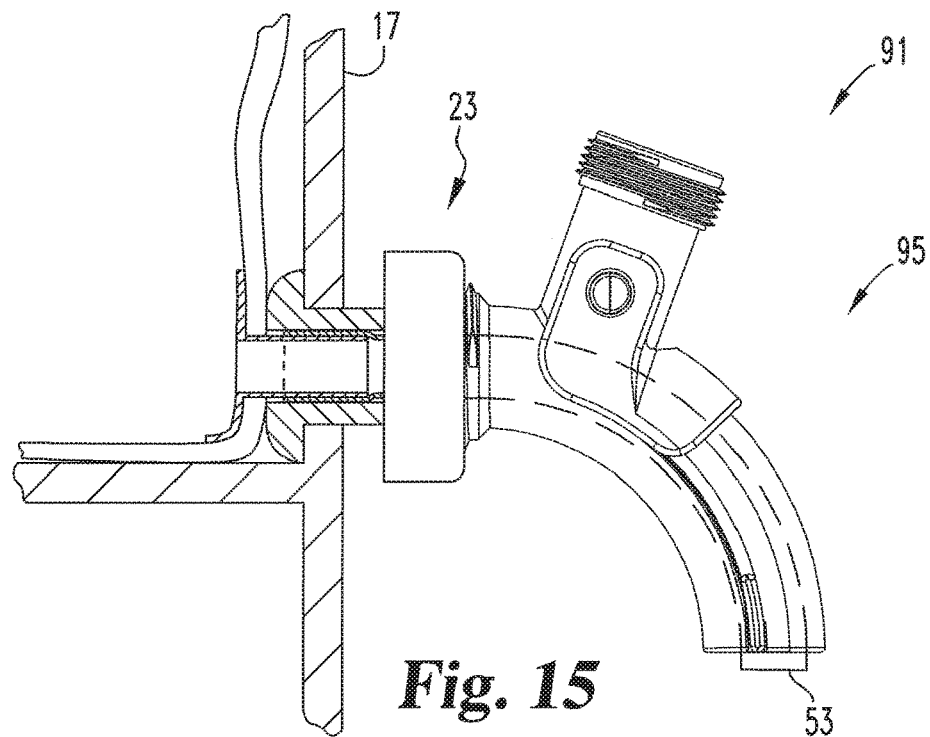
FIG. 15 is a side, partially cross-sectional and enlarged view of the faucet assembly 91 and a portion of the container 17 of the beverage dispensing system 90 of FIG. 14, and with the faucet assembly 91 in the closed position 95.

In use, referring to FIG. 14, a container liner assembly 13 is inserted into the container cavity 21, and its tube 53 is inserted into the central passageway 50 of fitting 45 at the bottom of the container 17. There, tube 53 is easily pushed through the central passageway 50 and through the adjoining central passageway 103, there hitting only minimal, and virtually unnoticeable resistance at the plunger 74 and/or the top of the central passageway 103 at 182 (just before plunger 74) or at 183 (just after plunger 74). Thereafter, tube 53 can easily be pushed all the way out until the bag fitting 45 (if the fitting is on the outside of the bag 39) or the bag 39 at the bag fitting 45 (if the fitting is on the inside of the bag) abuts the annular ring section 30 of grommet 25. At this stage, the distal end 186 of tube 53 can freely extend, unrestricted by any frictional effects, between distal body portion 98 and lid 93. Next, lid 93 is pushed from its open position 96 toward distal body portion where the distal end 187 of lid 93, and specifically, the curved end 189 of lid trough 147 (FIG. 16) contacts tube end 185. The ridge peaks 191 and 192 (formed between trough 147 and ridge channels 153 and 154, FIG. 13), particularly at or near the distalmost end 152 of lid 93, will approach and engage tube 53 on opposite sides thereof and center it as it is seats into trough 147. As lid 93 is further pivoted about its hinged connection at hinge posts 160 and 161, it pushes tube 53 toward and into the trough 129 of lower portion 126. The final push of lid 93 snaps it into its snapped, closed position 95 with tube 53 firmly seated between troughs 129 and 147. Thus, as shown in FIG. 15, tube 53 now extends through the combined passageway 121 and, because its outer diameter is substantially the same or only slightly less than the inner diameter of combined passageway 121, tube 53 follows the arcuate path of combined passageway 121 without any room to kink.

Alternative embodiments are contemplated wherein the ridge peaks have other configurations. For example, instead of forming continuous peaks 191 and 192 (or just one peak, e.g. 191) from inner end 151 to distalmost end 152, there could be a broken line of peaks that together register into mating voids are space defined by the mating upper portion 127. What matters is that the peaks 191 and 192 or other structure define the distal passageway 117 that holds the tube 53 in the desired shape (curved or otherwise) with nearly, and preferably no kinking. Alternative embodiments are also contemplated wherein the mutually engaging structures of the upper portion 127 of distal body portion 98 and of lower portion 126 of lid 93 are switched. That is, peaks 191 and 192 or other structure that guide tube 53 into a nested position between mating troughs 129 and 147 would instead extend from upper portion 127.

Because the insertion path for tube 53 here comprises the straight central passageway 50 and the short central passageway 103, which is curved only a short distance, tube 53 meets only limited frictional resistance. Thus, where a tube to be pushed through a faucet with a long, curved and highly resistive path had to be thick enough to enable it to be pushed, a tube 53 being inserted into faucet assembly 91 need not be as thick. In one embodiment, for an outer tube diameter of 0.390 inches, the tube wall thickness is reduced from a common thickness of 0.070 inches (thus an inner diameter of 0.250 inches) to 0.040 inches (and thus an inner tube diameter of 0.310 inches). Reducing the wall thickness, thus increasing the tube's inner diameter, increases the cross-sectional area of the lumen, which thus enables an increase in the flow rate of liquid exiting the container 11 through tube 53.

Alternative embodiments are contemplated wherein lid 93 is constructed so that the tube 53 can be pushed through the first, central passageway 103 and hit no obstruction, and the lid 93 is then closed to encase it between main body 92 and its lid 93. Such configuration would include the first, central passageway 103 having no curvature, and the entire curvature (as in FIG. 1, from zero degrees out of container 17, at 69, to the desired exit angle, such as 90 degrees, at 70) would thus be defined by the lid 93 and the mating distal body portion.

It is noted that the size and shape of the plunger 74 (FIG. 2) may vary from one faucet assembly to another. The present invention thus contemplates that the main body define an opening (194 in FIGS. 4 and 195 in FIG. 17) through which the plunger 74 extends be large enough to accommodate a variety of plunger sizes. This increases the chance that the leading end 196 of the tube 53, as it is being inserted, could hit and get caught up at the lowermost end 197 of plunger 74 or the far, lower corner 198 of the main body 60 and valve body 64.

Lid 93 is hingedly connected to main body 92 to enable pivoting opening and closing of the lid 93 against main body 92. Alternative embodiments are contemplated wherein the lid or other structure is removably connected to the main body to create the distal passageway 117. For example, and without limitation, the nub and pocket combinations (142/143 and 157/158, and 144/145 and 159) may be configured to be strong enough by themselves or with additional elements to removably hold the lid 93 in position against main body 92 without the added connective structure of the hinge. Also, additional structures such as a separate band, snap-tie or ring may be applied to hold the lid in position against the main body. What is important is that the lid (or similar structure) be held in position during normal use of the faucet and there positioned to hold the tube 53 in its desired curved position without kinking.

Figure 18:
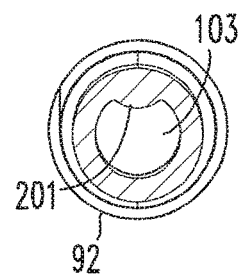
FIG. 18 is a cross-sectional view of the faucet assembly 200 of FIG. 17 taken along the lines 18-18 and viewed in the direction of the arrows.
Figure 17:
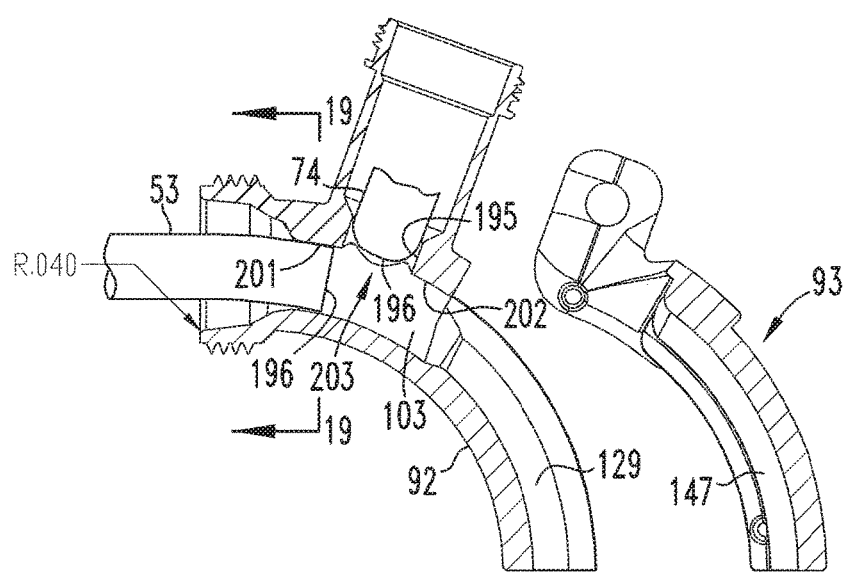
FIG. 17 is a side, cross-sectional and exploded view of a faucet assembly 200 for the beverage dispensing system 90 of FIG. 3 in accordance with another embodiment of the present invention.

Referring to FIGS. 17 and 18, there is shown a faucet assembly 200 in accordance with an alternative embodiment of the present invention. Faucet assembly 200 is like faucet assembly 91 of FIG. 8 except that the structure of main body 92 at the upper surface of central passageway 103 extends down farther into central passageway 103 to form a bump 201 for guiding the tube 53 as it enters passageway 103 and is pushed toward the opening between upper and lower troughs 147 and 129, respectively. Bump 201 is curved convexly in cross-section, as shown in FIG. 18 and extends down a distance enough to help the tube's leading end 196 not get caught up on the lower most end 196 of plunger 74. Bump 201 is continued on the downstream side (at 202) of the plunger hole 203, as shown. Alternative embodiments are contemplated wherein bump 201 is curved concavely in cross-section to match the outer, circular shape of the tube 53 and guide it centrally along its path.

Referring to FIGS. 19-21, there is shown a faucet assembly 210 in accordance with an alternative embodiment of the present invention. Faucet assembly 210 is the same as faucet assembly 91 except that it further includes a cap locking assembly 212, which includes a locking cap 213 and the main body 214 having a lock ring 215. Lock ring 215 is an annular ring that extends radially outwardly from the valve housing 218 of main body 214 just below the threads 219 at the top of valve housing 218. The top surface 223 of lock ring 215 contains numerous indentations, here in the form of a series of parallel channels 224 that thus form a series of parallel locking ridges 225.

Locking cap 213 is like the cap 65 of the faucet assembly 12 (FIG. 2), having a hole in its top (not shown) through which extends the post (not shown) for the handle 75 (FIG. 2), which is connected with the plunger of the valve assembly 62. Cap 213 is internally threaded so that it can be screwed onto the threaded top 220 to hold the handle 75 and other valve assembly components in their proper operating position. The outer surface 230 of cap 213 is generally cylindrical, or as here, has a slight taper (thus, frustoconical) and further includes a number of external, raised ridges 231 (here there are 8 ridges) spaced around its outer surface 230. Extending a short distance below the lower, circular rim 232 of cap 213, from some of the ridges 231, are locking nibs 235. Here, a nib 235 extends downwardly from every other ridge 231, but alternative embodiments are contemplated wherein there are more or less ridges 231, wherein there are more or less nibs 235, the nibs 235 extend down from any other combination of the ridges, and the nibs 235 extend down from any other location(s) on cap 213.

Cap 213 and its nibs 235 are made of any suitable plastic wherein the nibs 235 are resilient enough to bend slightly. Thus, as cap 213 is screwed onto the valve housing top 220 and its nibs 235 approach and engage the locking ring top surface 223, further rotation of cap 213 further lowers cap 213, and its nibs must bend slightly until one or more pass into the void of a corresponding locking channel, where they resiliently return to their pre-bent shape. This will cause an audible clicking sound and a tactile locking feeling, upon which the user will know the cap 213 is releasably locked. Where the cap 62 of faucet assembly 12 can be inadvertently unscrewed by casual use and contact, additional, and more importantly, intentional rotational force must be applied to unscrew cap 213 owing to the force necessary to cause the four locking nibs 235 to bend enough to pass back out of their locking channels 224.

The length, shape and composition of the nibs 235, as well as the number and placement of the nibs 235 is selected to produce a degree of resiliency of the nibs 235 to create the desired force required to lock and unlock cap 213. Alternative embodiments are contemplated wherein the nibs have other lengths, shapes, composition and placement. Alternative embodiments are contemplated wherein the indentations into which the nibs (or other locking protrusions) resiliently extend are formed in different shapes, sizes and locations. For example, locking ring 215 could instead have an outer serrated edge against which locking nibs engage, or instead of channels, locking ridge could defined a series of holes.

Alternative embodiments are contemplated wherein the protrusions extend upwardly from the valve housing, and the lid defines indentations into which such protrusions extend. Alternative embodiments are contemplated wherein the releasable locking engagement between cap and valve housing is achieved by other configurations, as well, for example, both the valve housing and cap could have protrusions extending therefrom that mutually engage as the cap is screwed downwardly.

Both main body 92 and 93 are shown substantially solid so that the tube 53 extending through combined passageway 121 is not therein visible, alternative embodiments are contemplated wherein the structures of main body 92 and/or lid 93 may be of any other configuration, so long as the tube 53 is closed held in its curved condition without kinking. This also means that the surfaces of lid 93 and main body 92 that are brought into mutual contact may be virtually any other structure than the edges 155/156 and ledges 140/141, respectively.

It is noted that the valve housing 99 of faucet assembly 91 is positioned to guide a plunger 74 to enter the central passageway 103. Alternative embodiments are contemplated wherein the lid 93 is configured to allow the faucet's plunger to enter and pinch of the tube 53 at a point in the distal passageway 117. Such configuration contemplates the valve housing be formed with the lid so that the combined lid and valve housing would move between closed and open positions. Preferably, such combined lid and valve housing would be hingedly connected to their mating main body, but other embodiments include the combined lid and valve housing to be completely removable and snapped into their closed position against the main body.

While the invention has been illustrated and described in detail in the drawings and foregoing description, the same is to be considered as illustrative and not restrictive in character, it being understood that only the preferred embodiment and limited additional embodiments have been shown and described and that all changes and modifications that come within the spirit of the invention are desired to be protected. It is specifically intended that the present invention not be limited to the embodiments and illustrations contained herein, but rather that the invention further include modified forms of those embodiments including portions of those embodiments and other embodiments and combinations of elements of such various embodiments as come within the scope of the following claims.

What is claimed is:

1. A faucet assembly for a beverage dispensing container and container liner assembly with a tube, the container having a fitting assembly, the faucet assembly comprising:
   a main body having a first surface and connection means for connecting said main body to the fitting assembly;
   a lid having a second surface and closed and open positions, the closed position including the first surface being held against the second surface so that said lid and said main body define a distal passageway for holding the tube and having a centerline, the centerline defining three points not on a straight line, and the open position including the first surface being in a position not held against the second surface; and
   a valve assembly connected with and extending upwardly from said main body for selectively pinching closed a tube extending through the distal passageway, wherein said lid is hingedly connected to said valve assembly to pivot between the closed and open positions.

2. The faucet assembly for a beverage dispensing container of claim 1 wherein the distal passageway defines a distal centerline and said main body defines a central passageway with a central centerline, as least a portion of which intersects the distal centerline.

3. The faucet assembly for a beverage dispensing container of claim 2 wherein the distal centerline has a distal radius of curvature and the central centerline has a central radius of curvature.

4. The faucet assembly for a beverage dispensing container of claim 3 wherein said main body defines a central passageway and the distal passageway and central passageway together define a combined passageway with a radius of curvature.

5. The faucet assembly for a beverage dispensing container of claim 1 wherein said main body defines an upper portion trough and said lid defines a lower portion trough, the upper portion trough and lower portion troughs together defining the distal passageway.

6. The faucet assembly for a beverage dispensing container of claim 5 wherein one of said main body and said lid defines at least one peak that extends toward the other of said main body and said lid to guide the tube into a nesting position between said troughs when the lid is in the closed position.

7. The faucet assembly for a beverage dispensing container of claim 1 further including locking means for releasably locking said lid into the closed position with the tube extending through the distal passageway.

8. The faucet assembly for a beverage dispensing container of claim 1 wherein the tube has an outer tube diameter and the distal passageway defines a passageway inner diameter that is between zero and 0.010 inches less than the outer tube diameter.

9. The faucet assembly for a beverage dispensing container of claim 1 wherein the tube has an outer tube diameter and the distal passageway defines a passageway inner diameter that is between zero and 0.005 inches less than the outer tube diameter.

10. The faucet assembly for a beverage dispensing container of claim 1 wherein the tube has an outer tube diameter and the distal passageway defines a passageway inner diameter that is between zero and 0.002 inches less than the outer tube diameter.

11. A faucet assembly for a beverage dispensing container and container liner assembly with a tube, the container having a fitting assembly, the faucet assembly comprising:
    a main body having a distal body portion and connection means for connecting said main body to the fitting assembly;
    a lid having closed and open positions, the closed position including said lid being held proximal the distal body portion to define a passageway for receipt of the tube; and
    a valve assembly connected with and extending upwardly from said main body for selectively pinching closed a tube extending through the distal passageway, wherein said lid is hingedly connected to said valve assembly to pivot between the closed and open positions.

12. The faucet assembly for a beverage dispensing container of claim 11 wherein the distal passageway has a centerline that defines three points not on a straight line.

13. The faucet assembly for a beverage dispensing container of claim 11 wherein the open position includes at least a portion of said lid having been moved from the closed position and away from the distal body portion and from the tube.

14. The faucet assembly for a beverage dispensing container of claim 11 wherein the distal passageway defines a distal centerline and said main body defines a central passageway with a central centerline, as least a portion of which intersects the distal centerline.

15. The faucet assembly for a beverage dispensing container of claim 14 wherein the distal centerline has a distal radius of curvature and the central centerline has a central radius of curvature.

16. The faucet assembly for a beverage dispensing container of claim 15 wherein said main body defines a central passageway and the distal passageway and central passageway together define a combined passageway with a radius of curvature.

17. The faucet assembly for a beverage dispensing container of claim 11 wherein said main body defines an upper portion trough and said lid defines a lower portion trough, the upper portion trough and lower portion troughs together defining the distal passageway.

18. The faucet assembly for a beverage dispensing container of claim 17 wherein one of said main body and said lid defines at least one peak that extends toward the other of said main body and said lid to guide the tube into a nesting position between said troughs when the lid is in the closed position.

19. The faucet assembly for a beverage dispensing container of claim 11 further including locking means for releasably locking said lid into the closed position with the tube extending through the distal passageway.

20. The faucet assembly for a beverage dispensing container of claim 11 wherein the tube has an outer tube diameter and the distal passageway defines a passageway inner diameter that is between zero and 0.010 inches less than the outer tube diameter.

21. The faucet assembly for a beverage dispensing container of claim 11 wherein the tube has an outer tube diameter and the distal passageway defines a passageway inner diameter that is between zero and 0.005 inches less than the outer tube diameter.

22. The faucet assembly for a beverage dispensing container of claim 11 wherein the tube has an outer tube diameter and the distal passageway defines a passageway inner diameter that is between zero and 0.002 inches less than the outer tube diameter.

23. A beverage dispensing system, comprising:
a container having side walls and a bottom that together define a cavity, the side walls defining a container hole, and said container further having a fitting assembly mounted to the side walls at the container hole;
a liner assembly including a bag and a tube, the bag having sides defining an interior and a bag hole, and the tube having a lumen and being connected to the sides at the bag hole so that the lumen is in communication with the bag interior; and
a faucet assembly having a main body with a distal body portion and connection means for connecting the main body to the fitting assembly, said faucet assembly further including a lid having closed and open positions, the closed position including the lid being held proximal the distal body portion to define a passageway for receipt of the tube, and said faucet assembly further including a valve assembly connected with the main body for selectively pinching closed a tube extending through the distal passageway.

24. The faucet assembly for a beverage dispensing container of claim 23 wherein the open position includes at least a portion of the lid having been moved from the closed position and away from the distal body portion and from the tube.

25. The faucet assembly for a beverage dispensing container of claim 23 wherein the lid is hingedly connected to the main body to pivot between the closed and open positions.

26. The faucet assembly for a beverage dispensing container of claim 23 wherein the main body includes a valve body extending upwardly from the main body and wherein the lid is hingedly connected to the valve body to pivot between the closed and open positions.

27. The faucet assembly for a beverage dispensing container of claim 23 wherein the distal passageway defines a distal centerline and the main body defines a central passageway with a central centerline, as least a portion of which intersects the distal centerline.

28. The faucet assembly for a beverage dispensing container of claim 27 wherein the distal centerline has a distal radius of curvature and the central centerline has a central radius of curvature.

29. The faucet assembly for a beverage dispensing container of claim 28 wherein the main body defines a central passageway and the distal passageway and central passageway together define a combined passageway with a radius of curvature.

30. The faucet assembly for a beverage dispensing container of claim 23 wherein the main body defines an upper portion trough and the lid defines a lower portion trough, the upper portion trough and lower portion troughs together defining the distal passageway.

31. The faucet assembly for a beverage dispensing container of claim 30 wherein one of the main body and the lid defines at least one peak that extends toward the other of the main body and the lid to guide the tube into a nesting position between the troughs when the lid is in the closed position.

32. The faucet assembly for a beverage dispensing container of claim 23 further including locking means for releasably locking the lid into the closed position with the tube extending through the distal passageway.

33. The faucet assembly for a beverage dispensing container of claim 23 wherein the tube has an outer tube diameter and the distal passageway defines a passageway inner diameter that is between zero and 0.010 inches less than the outer tube diameter.

34. The faucet assembly for a beverage dispensing container of claim 23 wherein the tube has an outer tube diameter and the distal passageway defines a passageway inner diameter that is between zero and 0.005 inches less than the outer tube diameter.

35. The faucet assembly for a beverage dispensing container of claim 23 wherein the tube has an outer tube diameter and the distal passageway defines a passageway inner diameter that is between zero and 0.002 inches less than the outer tube diameter.

36. A beverage dispensing system, comprising:
a container having side walls and a bottom that together define a cavity sized for receipt of a container liner assembly with a tube having a lumen, the side walls defining a container hole sized for receipt of the tube, and said container further having a fitting assembly mounted to the side walls at the container hole; and
a faucet assembly having a main body with a distal body portion and connection means for connecting the main body to the fitting assembly, said faucet assembly further including a lid having closed and open positions, the closed position including the lid being held proximal the distal body portion to define a passageway for receipt of the tube extending from inside the container cavity, and said faucet assembly further including a valve assembly connected with the main body for selectively pinching closed a tube extending through the distal passageway.

37. The faucet assembly for a beverage dispensing container of claim 36 wherein the open position includes at least a portion of the lid having been moved from the closed position and away from the distal body portion and from the tube.

38. The faucet assembly for a beverage dispensing container of claim 37 wherein the lid is hingedly connected to the main body to pivot between the closed and open positions.

* * * * *